March 22, 1949.    B. E. LENEHAN    2,465,241
TELEMETERING SYSTEM
Filed Dec. 15, 1945

WITNESSES:

INVENTOR
Bernard E. Lenehan.
BY
ATTORNEY

Patented Mar. 22, 1949

2,465,241

UNITED STATES PATENT OFFICE 2,465,241

TELEMETERING SYSTEM

Bernard E. Lenehan, Bloomfield, N. J., assignor to Westinghouse Electric Corporation, East Pittsburgh, Pa., a corporation of Pennsylvania Application December 15, 1945, Serial No. 635,350

3 Claims. (Cl. 177—351)

This invention relates generally to telemetering or remote-metering systems.

An object of this invention is to provide a remote-metering system which is simple in its elements and positive in its operation.

Another object of this invention is to provide a system of the class described which involves a minimum number of conductors between the electrical element responsive to the condition to be measured and the indicating or response instrument.

A further object of this invention is to provide a system of the type referred to which is substantially insensitive to fluctuations at the source of electrical energy.

A still further object of this invention is to provide a telemetering system embodying a meter having high operating forces.

Figure 1:
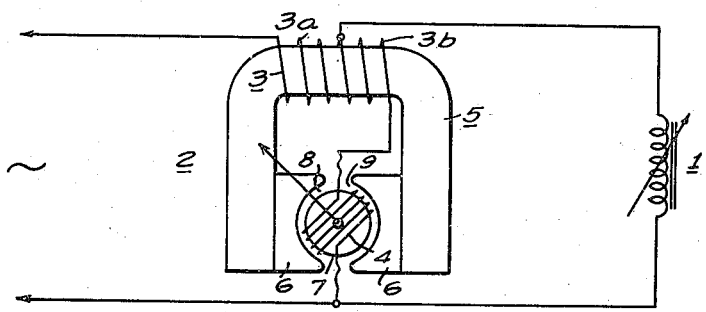
Figure 2:
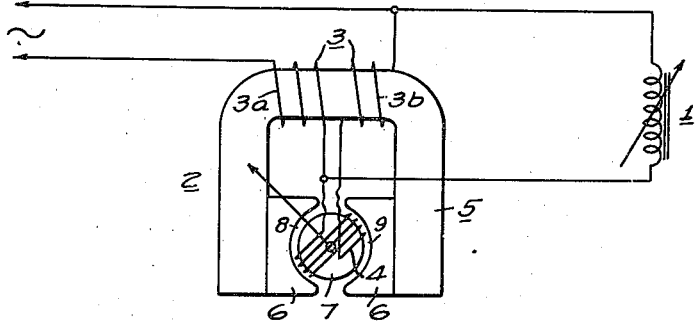

The foregoing objects are merely illustrative of the various aims and objects of this invention. Other objects and advantages will become apparent upon a study of the following specification when considered in conjunction with the accompanying drawing, in which:

Fig. 1 illustrates a telemetering system embodying the principles of this invention, and Fig. 2 is a variation of the system of Fig. 1.

Referring now to Fig. 1 of the drawing, the invention therein illustrated includes two main elements. The first is variable electrical element 1 suitably constructed and arranged that the electrical properties thereof may be varied in dependence of a condition to be determined and the second is an indicating instrument generally indicated at 2.

As illustrated the electrical element 1 is a variable reactor and, by way of example, may be a conventional magnetic strain gauge including a coil and variable reluctance magnetic circuit, or other device, constructed and arranged so that its electrical properties may be varied in an amount depending upon the condition to be measured. Other applications of this invention are in the remote indication of position of various control elements of aircraft. In such applications the electrical properties of the electrical element 1 would be varied depending upon the position of a particular control element. Numerous other applications may be mentioned and in all these some variation in construction of a device diagrammatically represented by the electrical element 1 may be had. It is further to be understood that the control of the electrical element 1 may be either manual or automatic.

The indicating instrument 2 includes a stationary exciting winding 3 and a movable or pivoted coil 4. These windings are linked by a magnetic circuit which comprises the core structure 5 having the confronting arcuate extremities 6 and a cylindrical core 7 concentrically disposed between the arcuate surfaces, thereby forming the arcuate airgaps 8 and 9. The movable coil 4 is pivotally mounted about the axis of the core 7 such that the coil sides, upon angular movement of the coil, move through the arcuate airgaps 8 and 9.

There are no restraining springs biasing the movable coil to its zero position, the actuating and restraining forces acting thereon being magnetic. Electrical currents are conducted to the moving coil through the medium, for example, of dead soft conducting spirals which, in the ideal case, in no wise mechanically bias the moving or pivoted coil. Thus any turning moments acting on the moving coil as a result of magnetic effects must be opposed or their effects brought effectively to zero as the coil moves, by changing electrical and magnetic conditions in the instrument. Specifically stated the movable coil 4 assumes a position in which the current traversing the coil is zero or a small residual value, 90° out of phase with the magnetic field of the instrument, the instantaneous phase relation of the coil current and magnetic field, that is, whether the coil current is leading or lagging the magnetic field by an angle greater or less than 90°, determining the direction of coil movement.

As illustrated the transmitting element or reactor 1 is connected in series with a section 3a of the stationary exciting winding 3 across a suitable source of alternating current here represented by the sinusoidal wave. The moving coil 4 is connected in series with another portion 3b of winding 3 in parallel with the reactor 1.

Changes in the reactance of the variable reactor 1 are reflected in corresponding reactance changes of the electrical instrument elements with which the variable reactor is in parallel circuit relation and cause a change in mechanical relation of the coil current to the instruments magnetic field. The coil currents are thus sufficiently changed in relation to the instruments magnetic field, to produce a predominating torque acting on the movable coil in one rotational direction. As the coil moves angularly its linkage with the instruments magnetic field changes. As a consequence the reactance of the movable coil progressively changes with rotation thereof and progressively changes the magnitude of the coil current. When the coil current in the theoretical case is zero, or a small residual amount, 90° displaced in phase with respect to the instruments magnetic field, coil movement ceases.

The path of the main current is through the left hand portion 3a of the winding 3 and the reactor 1. Normally at mid scale the voltage across the reactor 1 and the right hand half 3b of winding 3 are equal and these opposed voltages appear across movable coil 4. If the impedance of reactor 1 decreases the voltage thereacross falls and more voltage appears across winding 3, causing a current to flow in the movable coil 4. This current turns the movable coil in such a direction that the voltage induced therein and the current resulting therefrom, in effect, neutralizes the conducted current. At this point the voltage in the coil circuit is small and out of phase, so only a small out of phase coil current results. If the coil 4 should be moved by physical forces the voltage balance is disturbed and a current flows in the direction to restore the coil to its proper position.

The embodiment of the invention illustrated in Fig. 2 incorporates the essential features of Fig. 1 and differs therefrom only in circuit details. Here the sections of the exciting winding designated 3a and 3b are separated and the movable coil is connected in series therebetween. Variable reactor 1 is connected across the movable coil 4 and winding 3b. Electrically this modified circuit is the substantial equivalent of the circuit of Fig. 1 and the operation of the telemetering system is unchanged. The requirements for mid scale instrument position is again that the voltages of the reactor 1 and coil 3b shall be substantially balanced. If the impedance of reactor 1 is lowered the voltage thereof drops. The resulting voltage disturbance produces conducted currents through the turns of the movable coil in such a direction as to effect coil movement to an angular position in which the induced currents and voltages approach equilibrium with the conducted quantities, at which point coil movement ceases. The operating principle set forth in connection with Fig. 1 is equally applicable here.

It should be noted at this point that the previously stated theory regarding the operation of this invention is tentatively offered that a better understanding of the invention may be had. There are other ways of explaining the system's operation and, while the theory offered is presently preferred, it is desired that no limitations as to any particular theory of operation shall be construed therefrom.

The instrument may be calibrated, that is, the deflection angle of the moving coil may be adjusted to agree with a particular setting of the variable reactor 1, by varying the leakage flux of the instrument in any suitable manner well known in the art. The scale of the instrument may be lengthened or shortened by varying the turns ratio between the sections 3a and 3b of the exciting winding.

There are several advantages inherent in the telemetering device of this invention. One of these is the relative insensitivity of the system to fluctuations in source voltage. This will be apparent when the electrical and magnetic effects of the instrument are considered. As previously stated movements of the coil 4 are effected by departures in average values of the voltage and/or current of coil 3 from the zero torque relationship of coil current to the instruments magnetic field. Fluctuations in source voltage do not change this relationship but merely change the relative magnitudes of the fluxes produced as a result of conducted currents in the exciting winding 3 and the movable coil 4. Since there is no shift in the relative relations of field flux and coil current the coil is undisturbed by the source voltage variations.

Another advantage resides in the use of an iron magnetic circuit in an electrodynamometer type of instrument in contradistinction to the usual electrodynamometer which has no well defined flux path. This expedient provides efficient linkage of the inductor elements of the instrument in that optimum values of field flux are obtainable for given values of magnetizing current thus providing high operating forces for the moving coil 4.

Yet another advantage is had in the fact that only two wires are required between the variable reactor and the other system elements facilitating installation and minimizing the possibility of errors usually present in systems involving more complicated connections.

The system is also relatively insensitive to changes in wire resistance as, for example, wire resistance changes resulting from temperature excursions, for the reason, wire resistance usually constitutes only a negligible portion of the apparent electrical resistance of the circuits in view of the fact that highly reactive circuit elements are utilized. Any resistance changes which may occur are, in effect, swamped in the effective resistance of high reactance circuits and therefore the resistance change constitutes only an error of the second order.

While this invention has been illustrated in connection with an instrument having a specific form of magnetic circuit it will be apparent to those skilled in the art that the invention is not necessarily limited to any specific type of magnetic circuit but may equally well be employed with other instruments embodying similar operating principles. Similarly detail variations in the circuit arrangement together with variations in the system elements may be had without departing from the spirit and scope of the present invention. Hence, it is desired that the foregoing disclosure and the showings made in the drawing be considered only as illustrative and not construed in a limiting sense. The only limitations are to be determined from the scope of the appended claims.

I claim as my invention:

1. In combination, an electric meter having a magnetic circuit of magnetic material, exciting winding means for the magnetic circuit, and a movable coil disposed to be linked by the magnetic circuit; said movable coil being mechanically unrestrained and being actuated by the magnetic effects acting thereon, circuit means connecting a terminal of said movable coil with a terminal of said exciting winding means to form a series circuit, the remaining terminal of said coil and the remaining terminal of said exciting winding means being adapted for connection to a supply of alternating current, and an inductor connected in parallel circuit relation with said movable coil and a portion of said exciting winding means.

2. In combination, an electric meter having a magnetic circuit of magnetic material, said magnetic circuit having arcuate extremities disposed in confronting relation, a cylindrical section of magnetic material disposed between said arcuate extremities so as to form therewith a pair of radial airgaps, a coil disposed for pivotal movement about the axis of said cylindrical section so that the coil turns on opposite sides thereof move through said radial airgaps, an exciting winding linking said magnetic circuit and connected in series with said movable coil, means for supplying alternating current to said exciting winding and said movable coil, and a variable impedance element connected in parallel with a portion of said exciting winding and said movable coil.

3. In combination, an electric meter having a magnetic circuit of magnetic material, said magnetic circuit having arcuate extremities disposed in confronting relation, a cylindrical section of magnetic material disposed between said arcuate extremities so as to form therewith a pair of radial airgaps, a coil disposed for pivotal movement about the axis of said cylindrical section so that the coil turns on opposite sides thereof move through said radial airgaps, exciting winding means comprising two winding sections, said movable coil being connected with a terminal of each of said winding sections to form a series circuit therewith, means for applying alternating current across the remaining two terminals of said two winding sections, a variable impedance element and circuit means connecting said variable impedance element in parallel with one of said winding sections and said movable coil.

BERNARD E. LENEHAN.

REFERENCES CITED

The following references are of record in the file of this patent:

UNITED STATES PATENTS

| Number | Name | Date |
|---|---|---|
| Re. 16,417 | Henderson | Sept. 7, 1926 |
| 1,713,850 | McCoy | May 21, 1929 |
| 1,881,394 | Aull | Oct. 4, 1932 |
| 2,097,226 | Miyazaki | Oct. 26, 1937 |